(12) United States Patent
Wahrén

(10) Patent No.: US 10,618,742 B2
(45) Date of Patent: Apr. 14, 2020

(54) AUTONOMOUS CONVEYOR SYSTEM

(71) Applicant: EWAB Engineering AB, Vadstena (SE)

(72) Inventor: Mats Wahrén, Vadstena (SE)

(73) Assignee: EWAB Engineering AB, Vadstena (SE)

( * ) Notice: Subject to any disclaimer, the term of this patent is extended or adjusted under 35 U.S.C. 154(b) by 42 days.

(21) Appl. No.: 16/080,836

(22) PCT Filed: Feb. 27, 2017

(86) PCT No.: PCT/EP2017/054506
§ 371 (c)(1),
(2) Date: Aug. 29, 2018

(87) PCT Pub. No.: WO2017/148863
PCT Pub. Date: Sep. 8, 2017

(65) Prior Publication Data
US 2019/0054587 A1 Feb. 21, 2019

(30) Foreign Application Priority Data

Mar. 1, 2016 (EP) ..................................... 16158118

(51) Int. Cl.
*B65G 37/02* (2006.01)
*B65G 43/10* (2006.01)
(Continued)

(52) U.S. Cl.
CPC ........... *B65G 37/02* (2013.01); *B23Q 7/1452* (2013.01); *B25J 9/0093* (2013.01); *B65G 43/10* (2013.01); *B65G 47/684* (2013.01)

(58) Field of Classification Search
CPC ........ B65G 37/02; B65G 43/08; B65G 43/10; B65G 47/684; B23Q 7/1447; B23Q 7/1452; B25J 9/0093
See application file for complete search history.

(56) References Cited

U.S. PATENT DOCUMENTS 5,884,746 A * 3/1999 Leisner .................. B65G 37/02
198/346.1
5,947,259 A * 9/1999 Leisner .................. B65G 21/12
198/465.3
(Continued)

FOREIGN PATENT DOCUMENTS

EP 0737543 A2 * 10/1996 ............. B65G 37/02
EP 0737543 A2 10/1996
(Continued)

OTHER PUBLICATIONS

International Search Report and Written Opinion for PCT/EP2017/054506 dated May 30, 2017.

*Primary Examiner* — Gene O Crawford
*Assistant Examiner* — Keith R Campbell
(74) *Attorney, Agent, or Firm* — Olive Law Group, PLLC

(57) ABSTRACT

Disclosed herein is a conveyor system comprising a plurality of work piece carriers, each presenting a machine readable and writable tag and being adapted for supporting at least one work piece during transportation. The system further comprises distribution highway conveyors each in the form of an endless conveyor adapted for transporting and circulating the work piece carriers, flow balancing conveyors and operation unit conveyors. Control of the system is achieved by autonomous switch control devices arranged at each intersection between conveyors to control the flow of the work piece carriers at the respective intersection.

17 Claims, 2 Drawing Sheets

(51) Int. Cl.
    *B23Q 7/14*     (2006.01)
    *B25J 9/00*     (2006.01)
    *B65G 47/68*     (2006.01)

(56) References Cited

U.S. PATENT DOCUMENTS 9,840,373 B2 * 12/2017 Schneider .............. B65G 37/02
2013/0313071 A1   11/2013 Kasuya et al.

FOREIGN PATENT DOCUMENTS

| JP | S57189914 A | 11/1982 |
|---|---|---|
| WO | 2012128705 A1 | 9/2012 |

\* cited by examiner

AUTONOMOUS CONVEYOR SYSTEM

CROSS REFERENCE TO RELATED APPLICATIONS

This application is a 35 USC 371 application of International PCT Patent Application No. PCT/EP2017/054506, filed on Feb. 27, 2017, which claims priority to European Patent Application No. 16158118.6, filed on Mar. 1, 2016; the contents of which are hereby incorporated by reference herein in their entireties.

TECHNICAL FIELD

The present disclosure relates to a conveyor system for moving work pieces between a set of operating stations.

The conveyor system is suitable for providing an autonomous production system, i.e. a system wherein work pieces are transported between operation stations without human intervention.

BACKGROUND

Conveyor systems are used in many types of manufacturing industries for moving work pieces between different types of operation stations.

Setting up such a conveyor system usually involves a large amount of programming; the control software needs to handle each sensor and each actuator as well as to keep track of each work piece and each operation station.

When changing the manufacturing system, it is usually a very challenging task to install or remove an operating station and to rebalance the system, such that no unintentional buffers are formed. This also involves modifying the control software, which usually involves a significant amount of labor.

Moreover, wear and stoppages may cause the system to drift over time, causing a need for rebalancing, which in turn requires reprogramming of the control software.

Hence, there is a need for a conveyor system which is easier and thus less costly to install, which is easier and thus less costly to modify and which is robust.

SUMMARY

Hence, a general object is to provide an improved autonomous conveyor system, and in particular such a system which can be installed and maintained at lower cost and which preferably is more robust.

The invention is defined by the appended independent claim, with embodiments being set forth in the dependent claims, in the following description and in the drawings.

According to a first aspect, there is provided a conveyor system, comprising a plurality of work piece carriers, each presenting a machine readable and writable tag and being adapted for supporting at least one work piece during transportation, at least two distribution highway conveyors each in the form of an endless conveyor adapted for transporting and circulating said work piece carriers and at least one flow balancing conveyor in the form of an endless conveyor adapted for transporting said work piece carriers. The distribution highway conveyors are interconnected via the flow balancing conveyor, such that said work piece carriers can pass from one of the distribution highway conveyors) via the flow balancing conveyor to the other distribution highway conveyor. The system further comprises at least two operation unit conveyors, each in the form of an endless conveyor adapted for transporting said work piece carriers. The operation unit conveyors are arranged to receive a work piece carrier from an associated distribution highway, to move it to an operation station, and to return the work piece carrier to the distribution highway after processing at the operation station. A respective tag writer device is configured to derive a next operation address and to write said address to the tag of the work piece carrier after the processing at the operation station. The system comprises autonomous switch control devices arranged at each intersection between conveyors to control the flow of the work piece carriers at the respective intersection.

A work piece carrier can be any type of carrier which is adapted for being transported on the conveyor and of carrying the work piece or work pieces at issue. Examples of carriers may include relatively small carriers, such as carriers for integrated circuits or circuit boards; or relatively large carriers, such as carriers for engines, gear boxes, chassis for machines or vehicles, or the like. The carrier may also be arranged to hold a work piece suspended below the conveyor, as is common, e.g. in painting applications.

A tag can be any type of tag that can be read by a machine. Preferably the tag has a writable and/or erasable memory. The tag may communicate through any type of interface, such as, but not limited to wireless interfaces like wifi, Bluetooth, RFID or NFC, or through electrical or optical interface. Any type of memory technique can be used.

A conveyor may be a chain type conveyor. Such conveyors are known as such and are available in a multitude of widths. Length and paths of each conveyor can be determined arbitrarily based on what is needed and on the space available.

The term "circulating" means that the conveyor is endless and adapted for allowing work piece carriers to follow the conveyor around its track. It is understood that an endless conveyor can be created by what is truly a single endless conveyor chain, or by a plurality of conveyor chains or belts, which together provide an endless path, along which work piece carriers may be circulated.

The term "autonomous" means that the control device carries out its normal operation without any external or central control. That is, during normal operation, the control device does not receive control signals from any centralized controller.

For example, the control device may be hard coded to provide only a single function, such as the stop control function or the switch control function.

Optionally, the control devices may be selectably set to one of a limited number of predefined functions, such as the stop control function or the switch control function. Such selection may be made through a user interface on the control device itself. As an alternative, the selection of the function can be done remotely, e.g. wirelessly or via a wired interface.

Once the preprogrammed function has been selected, it may not be possible to further adjust or otherwise affect the control device, except possibly to switch its function to one of the other preprogrammed functions. The control devices may be formed by the same hardware, with computer code providing both functions stored in the non-volatile memory and with the function being selectable, such that each control device can be set as a switch control device or a stop control device.

An operating station may be a station arranged to provide any type of manufacturing-related operation, such as machining (e.g. lathing, cutting, milling, drilling, grinding), bonding (welding, soldering, brazing, gluing, melt-bonding, etc.), inspection (e.g. measuring, scanning), surface treatment (e.g. painting, blasting, polishing, electro-plating, PVD or other type of material deposition), assembly, testing or packaging. The operation may be wholly or partially automated, or entirely manual.

A conveyor system as defined above wholly or partially achieves the objectives set forth above, since it is made up of a limited number of standard components, each of which operates autonomously. The only programming/control needed is that of the tag writer, which contains a set of rules for determining next operation based on the work piece type and on the operation just carried out.

The system may further comprise autonomous operation station control devices arranged at each operation station to control the flow of the work piece carriers at the respective operation station.

The (or each) operation station control device may be configured to read the memory tag and to provide an indication to the associated operation station to initiate an operation on the work piece.

The (or each) operation station control device may comprise the tag writer device and is configured to derive a next operation station address in response to a conclusion of an operation carried out at the operation station and to write a next operation address to the memory tag.

In the system, the tag may be configured to store information on work piece next destination and optionally on work piece. The address may be configured such that it is possible to derive which conveyor the work piece carrier is supposed to be on.

The tag only needs to contain information indicating what type of work piece is being transported, or if the carrier is empty, and on which station the work piece is to go next. In an even more simplified system, handling only one type of product, there may be no need for work piece type to be indicated in the memory.

The work piece carriers may be releasably engageable with the conveyors based on gravity-induced friction.

Hence, one of the work piece carriers may be stopped without the motion of the conveyor, and thus of the other work piece carriers currently transported on that conveyor, being affected.

At least one of the operation unit conveyors may comprise at least one loading and/or unloading station.

A loading or unloading station may be a station comprising a station where a work piece is loaded onto a work piece carrier or where a work piece is unloaded from a work piece carrier.

Preferably, only one of the operation unit conveyors comprises one or more loading stations and only one of the operation unit conveyors comprises one or more unloading stations.

The distribution highway conveyor may be free from operation stations.

In the system, first and second flow balancing switch control devices may be arranged at intersections between the flow balancing conveyor and respective distribution highway conveyors.

The first flow balancing switch control device may be arranged at an upstream intersection of the flow balancing conveyor with a first distribution highway conveyor, and may be configured to:

allow loaded work piece carriers to move to the flow balancing conveyor, until a predetermined number of loaded work piece carriers are present on the flow balancing conveyor, and allow only a predetermined number of empty work piece carriers to move from the flow balancing conveyor to the first distribution highway conveyor for a corresponding number of loaded work piece carriers that are allowed to move from the first distribution highway conveyor to the flow balancing conveyor, or vice versa.

Hence, for example, the flow balancing conveyor may be configured to only allow an empty work piece carrier to enter it once a loaded work piece carrier has left it, or vice versa.

As other options the flow balancing switch control device may allow a limited difference between loaded work piece carriers entering from and empty work piece carriers leaving to a specific distribution highway conveyor. Such difference may be limited to 1-5, preferably 1-3.

Moreover, it may be possible to release work piece carriers to the distribution highway conveyor in response to work piece carriers being admitted to the flow balancing conveyor, or to admit work piece carriers to the flow balancing conveyor in response to work piece carriers being released to the distribution highway conveyor.

The second flow balancing switch control device may be arranged at a downstream intersection of the flow balancing conveyor with a second distribution highway conveyor, and may be configured to:

allow empty work piece carriers to move from the second distribution highway conveyor to the flow balancing conveyor until a predetermined number of empty work piece carriers are present on the flow balancing conveyor, and allow only a predetermined number of loaded work piece carriers to move from the flow balancing conveyor to the second distribution highway conveyor for a corresponding number of empty work piece carriers that are allowed to move from the second distribution highway conveyor to the flow balancing conveyor, and vice versa.

The flow balancing switch control devices may be configured to read the memory tag and to control the flow to and/or from the flow balancing conveyor based on data contained on the memory tag.

As another option, the flow balancing switch control devices may comprise a tag writer, and be configured to update the memory tag to indicate on which of the flow balancing conveyor and the distribution highway conveyors the work piece carrier is to be located.

By indicating on which one of the conveyors the work piece carrier is to be situated, it is possible to counteract the problem with operators who sometimes manually move work piece carriers from one conveyor to another.

The flow balancing switch control devices associated with one flow balancing conveyor may be integrated with each other, thus effectively providing a single control device serving both switches associated with that flow balancing conveyor, and providing the functions set forth above.

The flow balancing conveyor may be free from operation stations.

The flow balancing conveyor may be a conveyor that is connected to two or more groups of distribution highway conveyors. However, the flow balancing conveyor itself does not connect to any operation station or to any operation unit conveyor.

An operation unit conveyor switch control device may be arranged at each intersection between an operation unit conveyor and the associated distribution highway conveyor.

The operation unit switch control device may be configured to read the memory tag of a work piece carrier arriving on the distribution highway conveyor and to allow the work piece carrier to move to the operation unit conveyor if data contained on the memory tag indicates an address which is associated with that operation unit conveyor.

The operation unit switch control device may be configured to allow work piece carriers to move to the operation unit conveyor until a predetermined number of work piece carriers are present on the operation unit conveyor.

The operation unit switch control device may be configured to:

detect a work piece carrier arriving on the operation unit conveyor, to detect a work piece carrier arriving on the distribution highway conveyor, and to allow the work piece arriving on the operation unit conveyor to move to the distribution highway conveyor only if there is no risk of collision.

The operation unit switch control device may be configured to read the memory tag of a work piece carrier arriving on the operation unit conveyor and to allow the work piece carrier to move to the distribution highway conveyor if data contained on the memory tag indicates an address which is not associated with that operation unit conveyor.

DETAILED DESCRIPTION

The system according to the present disclosure is a system for transporting work pieces between operation stations. The work pieces are transported on work piece carriers. To each of the distribution highway conveyors, one or more operation unit conveyors are connected. Each operation unit conveyor is adapted to convey work pieces from the associated distribution highway conveyor to an operation station, where an operation is carried out on the work piece.

Figure 1:
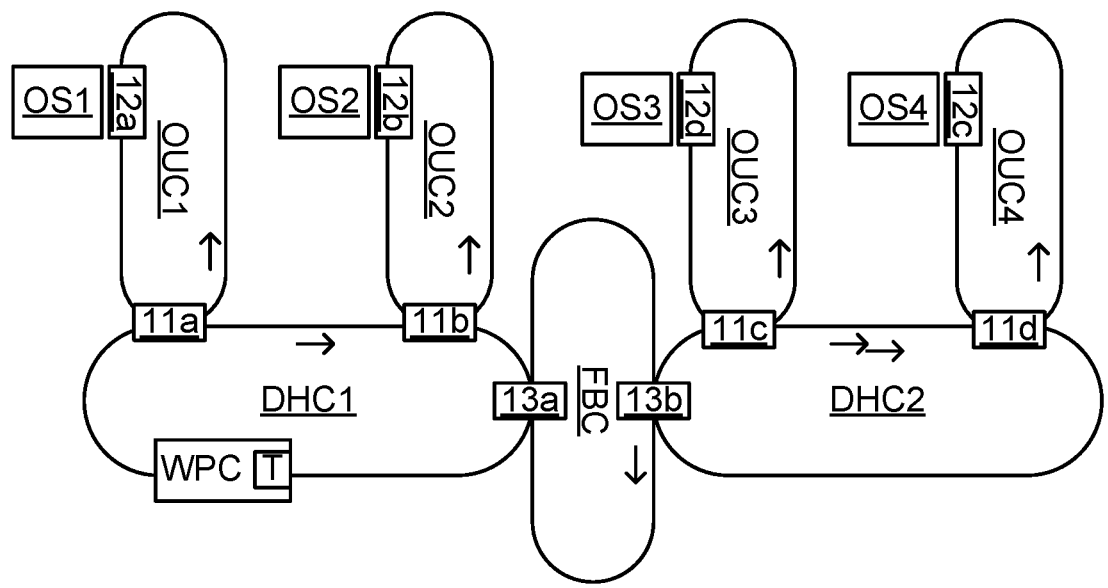
FIG. 1 is a schematic diagram drawing of a conveyor system according the present disclosure.

FIG. 1 is a schematic diagram of a conveyor system according to the present disclosure. This conveyor system comprises first and second distribution highway conveyors DHC1, DHC2, which are separated by a flow balancing conveyor FBC.

The first distribution highway conveyor DHC1 is adapted for conveying work piece carriers WPC to a pair of operation stations OS1, OS2, each being connected to the distribution highway conveyor by a respective operation unit conveyor OUC1, OUC2.

The second distribution highway conveyor DHC2 is adapted for conveying work piece carriers WPC to another pair of operation stations OS3, OS4, each being connected to the second distribution highway conveyor by a respective operation unit conveyor OUC3, OUC4.

Figure 4:
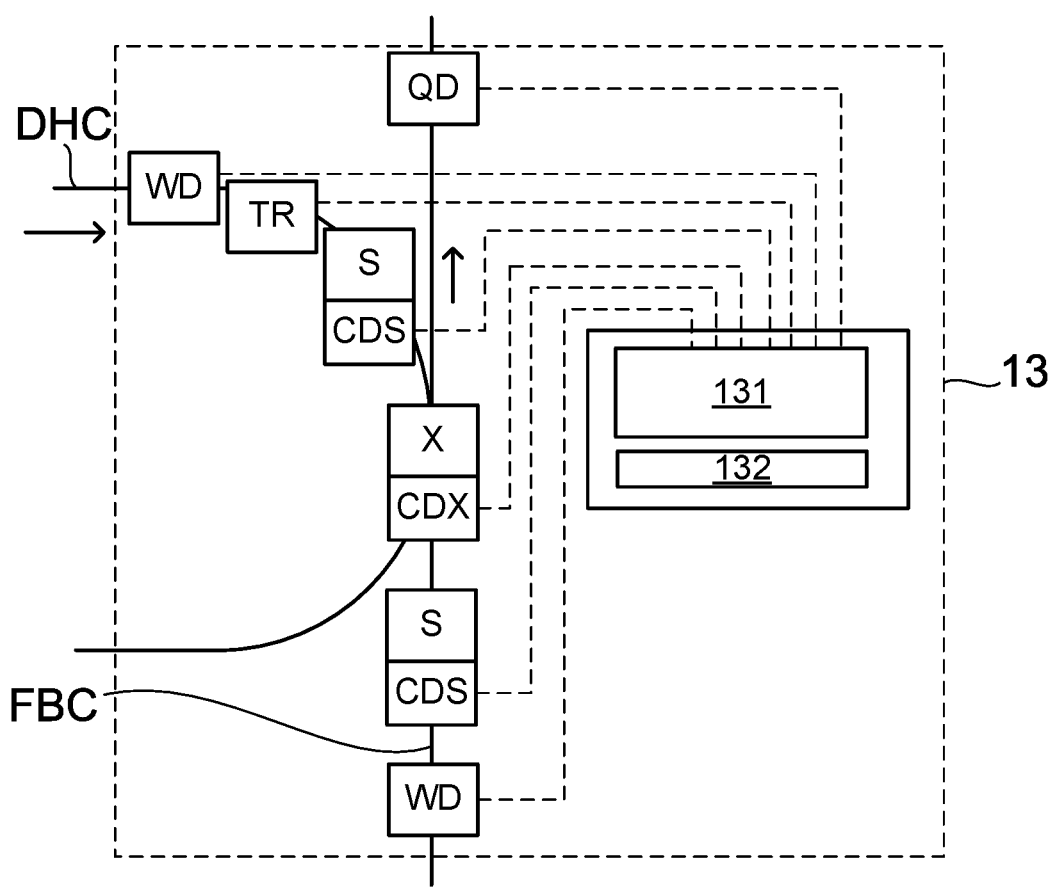
FIG. 4 is a schematic diagram of a flow balancer switch control device (FBCDX).

The first and second distribution highway conveyors DHC1, DHC2 are connected by a flow balancing conveyor FBC (see also FIG. 4).

The conveyors are formed as endless conveyors, capable of circulating work piece carriers, such that loaded work piece carriers are transported between the operation stations and empty work piece carriers are returned to a predetermined point, such as a starting point.

The conveyors may be of a chain type with work piece carriers being supported and moved by a gravitation-induced frictional engagement only. Preferably, such friction is relatively low, such that a work piece carrier may be halted without affecting the movement of the conveyor.

Arrows indicate an exemplary flow direction.

Each work piece carrier WPC may comprise a conveyor engaging portion and a work piece supporting portion. Such work piece supporting portion may be as simple as a horizontal surface, but it may also include a fixture or suspension device, such that the work piece can be securely moved around, perhaps even with a predetermined orientation.

Each Work piece carrier may be adapted to carry one work piece, or it may be adapted to carry two or more work pieces.

The work piece carrier WPC also comprises a memory tag T, which is machine readable and writable. The tag may only comprise information on work piece type and address to a next work piece destination.

For example, work piece type may take on predetermined value for each type of work piece that can be processed by the system, included a specific value to indicate that the work piece carrier is empty.

The address may include several portions, e.g. one portion indicating which distribution highway it is to proceed to and another one indicating which operation station it is to proceed to.

The memory tag may use any kind of coding, storage and interface technology. For example, data storage may, as non-limiting examples, be electronic, magnetic, mechanical or optical.

Interface technology may be RFID, NFC, wifi, Bluetooth®, electronic, inductive, magnetic, mechanical or optical.

As another option, the memory tag may be provided by the work piece itself, e.g. through a recognizable feature of the work piece. For example, the work piece may be visually inspected, e.g. using a camera, to determine whether a certain operation has been carried out or not.

The operation unit conveyor OUC1, OUC2, OUC3, OUC4 may also be formed as an endless chain type conveyor. Conveniently, the operation unit conveyor may use the same conveying technique and design as that of the distribution highway conveyors.

The operation unit conveyor may thus operate as an endless loop with an intersection to its associated distribution highway conveyor, such that work piece carriers may move between the operation unit conveyor and the distribution highway conveyor. The intersection may be controlled by an operation unit switch control device, which will be described below.

On the operation unit conveyor, there may be at least one operation station. That is, a station where at least one operation is carried out on the work piece.

The operation may, as non-limiting examples, be one or more of a manufacturing-related operation, such as machining (e.g. lathing, cutting, milling, drilling, grinding), bonding (welding, soldering, brazing, gluing, melt-bonding, etc.), inspection (e.g. measuring, scanning), surface treatment (e.g. painting, blasting, polishing, electro-plating, PVD or other type of material deposition), assembly, testing or packaging. The operation may be wholly or partially automated, or entirely manual.

The flow balancing conveyor FBC may also be formed as an endless chain type conveyor. Conveniently, the flow balancing conveyor may use the same conveying technique and design as that of the distribution highway conveyors.

The flow balancing conveyor may thus operate as an endless loop with an intersection to its associated distribution highway conveyors, such that work piece carriers may move between the distribution highway conveyor and the flow balancing conveyor. The intersections may be controlled by a respective flow balancing switch control device, which will be described below.

There is an operation unit switch control device (OUCDX) 11a, 11b, 11c, 11d at each intersection between distribution highway conveyor and operation unit conveyor.

Figure 2:
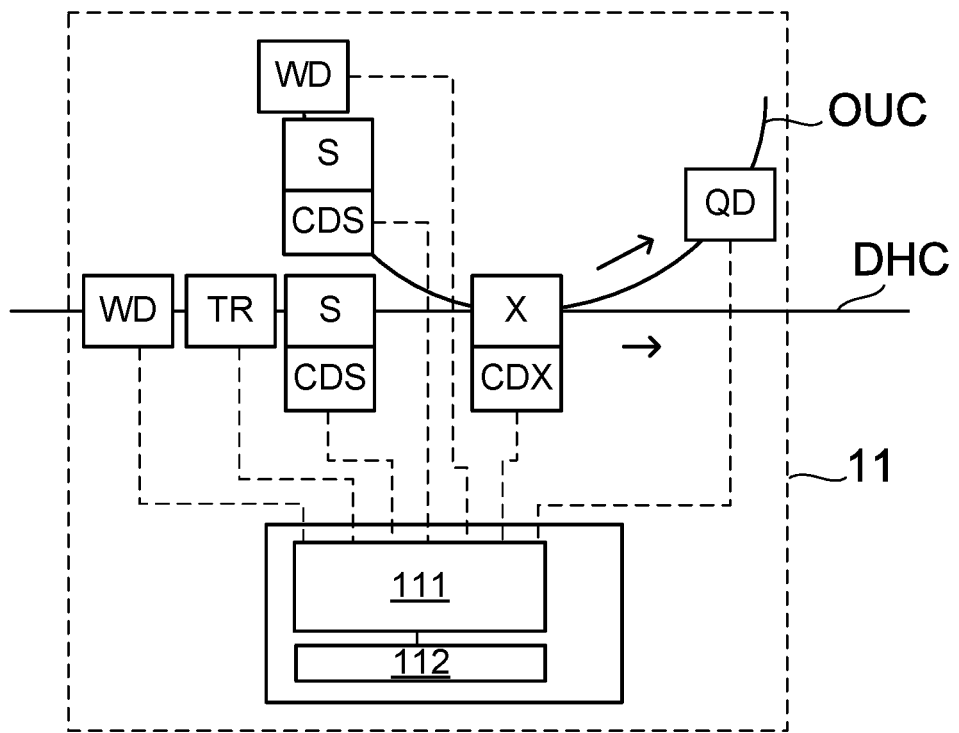
FIG. 2 is a schematic diagram of an operation unit switch control device (OUCDX).

Referring to FIG. 2, the OUCDX 11 comprises a controller 111, a memory 112, a switch actuator CDX controlling the switching mechanism X, work piece carrier detectors WD for detecting work pieces arriving on the distribution highway conveyor or on the operation unit conveyor, stop actuators CDS controlling stop mechanisms S on the distribution highway conveyor and on the operation unit conveyor and a memory tag reader TR.

The OUCDX may also comprise a queue detector QD arranged to detect whether a queue to its associated operation station OS1, OS2, OS3, OS4 (FIG. 1) is full.

The controller 111 is an autonomous controller. That is, the controller contains the operation instructions necessary to operate as an OUCDX without receiving any control signals from any external unit.

The OUCDX may function as follows.

The work piece carrier detector DW on the distribution highway conveyor DHC provides a signal to the controller 111 indicating that a work piece carrier WPC is arriving on the distribution highway conveyor DHC.

Optionally, the work piece carrier may be stopped by the stop mechanism S.

The stop mechanism may preferably be an electrically actuated stop mechanism. That is, the actuator which drives the stop mechanism is electrically driven. The control of the actuator may be electrical, optical or by radio frequency.

The memory tag T of the work piece carrier is read by the tag reader TR. If the address on the memory tag of the work piece carrier is not that of the current operation station the following steps will be carried out.

The controller 111 may detect whether any work piece carrier WPC is arriving on the operation unit conveyor OUC and determine whether there is risk of collision.

If this is the case, the controller 111 will decide which work piece carrier is prioritized and allow this work piece carrier to proceed.

If the address on the memory tag of the work piece carrier is that of the current operation station, then the following steps will be carried out.

The controller 111 detects using the queue detector QD whether the queue to the operation station is full. If it is, then the work piece carrier will be allowed to continue on the distribution highway conveyor.

The controller 111 will detect whether any work piece carrier is arriving on the operation unit conveyor and determine whether there is risk of collision.

If there is no work piece carrier arriving on the operation unit conveyor, and the queue to the operation station is not full, then the controller will actuate the switch mechanism X so as to allow the work piece carrier to enter the operation unit conveyor and move toward the operation station.

The switch mechanism may preferably be an electrically actuated switch mechanism. That is, the actuator which drives the switch mechanism is electrically driven. The control of the actuator may be electrical, optical or by radio frequency.

Figure 3:
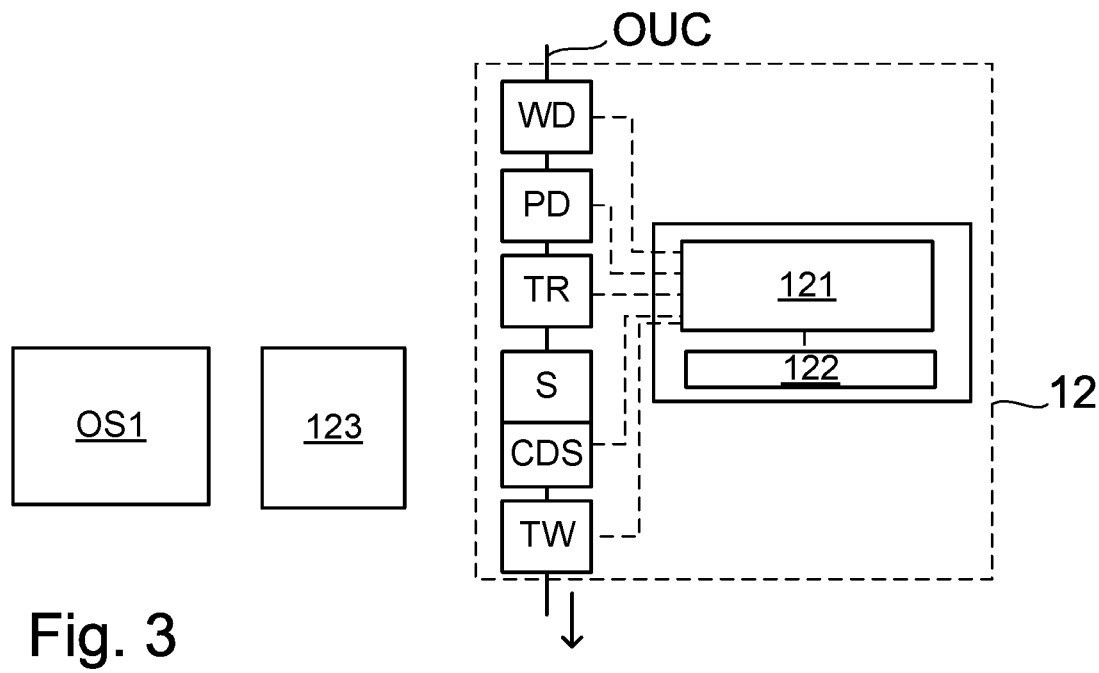
FIG. 3 is a schematic diagram of an operation unit stop control device (OUCDS).

At the operation station OS, OS1, OS2, OS3, OS4, there will typically be at least one operation station control device OSCD 12, which will now be described with reference to FIG. 3. This control device is arranged to control the flow to and/or from the operation station.

For example, the control device 12 may be arranged to detect arrival of a work piece carrier to the operation station. Such detection may be through a memory tag reader, or through any type of presence detector. Optionally, detection by the presence detector may trigger reading by the memory tag reader.

The operation unit control device 12, 12a, 12b, 12c, 12d may comprise a controller 121, a memory 122, work piece carrier detector WD, a tag writer TW, optionally a work piece presence detector PD and optionally a tag reader TR.

The control device 12 may control a stop actuator CDS, i.e. an actuator which drives a stop mechanism S which is capable of stopping the work piece carrier. Preferably, such stop is achieved without affecting the movement of the operation unit conveyor. That is, the conveyor OUC continues to move while the work piece carrier's motion is blocked.

The stop mechanism may preferably be an electrically actuated stop mechanism. That is, the actuator which drives the stop mechanism is electrically driven. The control of the actuator may be electrical, optical or by radio frequency.

The memory tag reader TR may identify work piece type and operation address. If the operation address is that of the current operation station, an operation may be initiated. The memory tag reader may not be needed where the memory tag would have been read upon the work piece carrier's entry into the operation unit conveyor.

A work piece moving equipment 123 (optional) may be provided where the work piece is not operated upon while on the conveyor OUC. The equipment may include a robot. Alternatively, the movement may be effected manually.

The operation may thus be carried out while the work piece is still on the carrier. Alternatively, the work piece and optionally also the work piece carrier may be moved from the operation unit conveyor to the operation station OS, OS1, OS2, OS3, OS4 where the operation is to take place.

The control device 121 may be arranged to receive a signal indicating that the operation has been concluded and that the work piece is ready to be moved. Such signal may be provided by the operation station, the movement equipment 123 or manually.

On receipt of such signal, the control device 121 may provide an address for a next operation station and write said address to the memory tag by means of the tag writer TW. The control device 121 may then release the work piece carrier by actuating the stop actuator CDS. The work piece carrier is then allowed to move towards the operation unit switch control device OUCDX.

Optionally, another operation station may be provided on the same operation unit conveyor, in which case the operations described above will be repeated.

The flow balancing switch control device (FBCDX) 13, 13a, 13b will now be described with reference to FIG. 4. For each flow balancing conveyor, there will be at least two FBCDX, one for each associated distribution highway conveyor. Hence, in the embodiment disclosed herein, there will be two FBCDX, each of which operates autonomously. As an alternative, the switch control devices for a flow balancer may be integrated, such that a single autonomous flow balancing switch control device handles both of the switches associated with the flow balancing conveyor.

An FBCDX comprises a controller 131 having a memory 132, a switch actuator CDX controlling the switching mechanism X, work piece carrier detectors WD for detecting work pieces arriving on the distribution highway conveyor DHC or on the flow balancing conveyor FBC and a tag reader TR. The FBCDX also comprises stop actuators CDS controlling respective stopping mechanisms S. The FBCDX 13, 13a, 13b may also comprise a queue detector QD arranged to detect whether a queue to the other FBCDX associated with the flow balancing conveyor is full.

The controller 131 is an autonomous controller. That is, the controller contains the operation instructions necessary to operate as an FBCDX without receiving any control signals from any external unit.

In the illustrated example, there will be two flow balancing switch control devices, FBCDX1, FBCDX2.

FBCDX1 will operate as follows.

The work piece carrier detector WD on the distribution highway conveyor DHC provides a signal to the controller 131 indicating that a work piece carrier is arriving on the distribution highway conveyor DHC.

Optionally, the work piece carrier may be stopped by the stop mechanism S controlled by the stop actuator CDS.

The stop mechanism may preferably be an electrically actuated stop mechanism. That is, the actuator which drives the stop mechanism is electrically driven. The control of the actuator may be electrical, optical or by radio frequency.

The memory tag T of the work piece carrier is read by the tag reader TR. If the address on the memory tag of the work piece carrier corresponds to an operation station that is situated on the other side of the flow balancing conveyor, such as on OS3 or OS4, the following steps will be carried out. The controller 131 may provide an updated address that will indicate that the WPC is to be on the associated FBC, and this address may be written to the memory tag T.

The controller 131 may detect whether any work piece carrier is arriving on the flow balancing conveyor and determine whether there is risk of collision.

If there is no work piece carrier arriving on the flow balancing conveyor, and the queue to FBCDX2 is not full, then the controller 131 will actuate the switch mechanism X so as to allow the work piece carrier to enter the flow balancing conveyor and move towards FBCDX2.

The switch mechanism may preferably be an electrically actuated switch mechanism. That is, the actuator which drives the switch mechanism is electrically driven. The control of the actuator may be electrical, optical or by radio frequency.

as one alternative, a counter in the controller 131 may then be increased to indicate that a work piece carrier has been allowed to enter the flow balancing conveyor.

As an alternative to a counter, it is possible to provide a detector on the flow balancing conveyor that senses each presence/absence of a work piece carrier at every possible work piece carrier position in the respective queue, such that the physical positions, or queue lengths, may be used as a basis for the decision on whether to receive or release a work piece carrier to/from the flow balancing conveyor.

If the address does not correspond to an operation station that is situated on the other side of the flow balancing conveyor, then the work piece will be allowed to continue on the distribution highway conveyor.

When a work piece arrives to FBCDX1 on the flow balancing conveyor, the controller 131 will operate as follows.

The controller may provide an updated address that will indicate which DHC it is to proceed to and this address may be written to the memory tag T by the tag writer.

The controller checks that there is no risk of collision with work piece carriers arriving on the distribution highway conveyor DHC1.

The controller checks the status of the counter, such that it indicates that a work piece carrier has been received to the flow balancing conveyor. If not, the work piece carrier is not allowed to leave the flow balancing conveyor.

However, if a work piece carrier has been received at the flow balancing conveyor, the current work piece carrier is allowed to proceed to the distribution highway conveyor DHC1.

The FBCDX2 will operate in the same way.

Thus, work piece carriers will be allowed to enter the flow balancing conveyor as long as there is space in the queue to the FBCDX at which they are to leave. However, work piece carriers are only released from the flow balancing conveyor if another work piece carrier has entered.

It is understood that loaded work piece carriers will typically arrive on the first distribution highway conveyor DHC1 and empty work piece carriers will arrive on the second distribution highway conveyor DHC2. According to the method described above, a loaded work piece carrier will be allowed to enter the second distribution highway conveyor DHC2 for every empty work piece carrier that is received at the same switch control device FBCDX2.

Similarly, an empty work piece carrier will be allowed to enter the first distribution highway conveyor DHC1 for every loaded work piece carrier that is received at the same switch control device FBCDX1.

As mentioned, each control device is autonomous, in that it does not receive any control signals from any other processing device. Hence, during normal operation, each control device receives detector/sensor signals, e.g. from work piece carrier detectors WD, tag readers TR, work piece presence detectors PD or queue detectors QD, processes them and provides control signals to actuators, such as stop control actuators CDS or to switch control actuators CDX, or to tag writers TW.

It is understood that the queue detector may be embodied in a detector, as mentioned above, on the flow balancing conveyor that senses each presence/absence of a work piece carrier at every possible work piece carrier position in the respective queue.

Hence, each controller may contain at least one set of control instructions, which may be implemented through e.g. software.

Each set of control instructions, i.e. each "program" or "subroutine" may contain instructions for handling one or more types of work pieces.

However, there may be different sets of control instructions, which may be selected during a configuration process, through which a selection is made on which mode the control device is to operate in. This selection may be made manually at each control device or centrally using a flow controller, as will be described below.

The system may further comprise one or more flow controllers.

A flow controller is a device which is capable of communicating with the control devices OUCDX, FBCDX, OSCD to provide configuration, that is to send instructions to the control devices on which set of operations is to be run.

Hence, the flow controllers do not control the control devices, but merely provides configuration.

Each control device operates autonomously, without exchanging control data with any centralized device during operation.

Hence, programming may be performed by the flow controllers via a network, but not the actual control.

This does not exclude communication of operation data, such as data on concluded operations, errors, alarms, etc.

The flow controller may thus have a user interface, by means of which configuration of each controller can be achieved.

The system may further comprise one or more network gateway arranged to collect data from flow controllers and/or from the control devices.

The system may, for example at the first operation unit conveyor OUC1, comprise one or more loading stations, wherein a starting material or product that is to form the work piece may be loaded onto a work piece carrier that is to transport the work piece in the system. The loading station may be an automatic or manual loading station. Thus, the operation station OS1 at the first operation unit conveyor OUC1 may be the loading station.

In the case where an operation station forms a loading station, then the address of empty work piece carriers may be the address of this operation station forming the loading station.

The system may, for example at the last operation unit conveyor OUC4, comprise one or more unloading stations. The unloading station may be an automatic or manual unloading station. Thus, the operation station OS4 at the last operation unit conveyor OUC4 may be the loading station.

In the case where an operation station forms an unloading station, then the last address of work piece carriers, i.e. the address assigned by the final operation station that performs work on the work piece, may be the address of this operation station forming the unloading station. The unloading station may then assign a new address to the empty work piece carrier, and this address may be the address of the operation station forming a loading station.

A work piece presence detector may be a sensor arranged to detect whether there is actually a work piece on the work piece carrier. Such a detector may be used to prevent damage which may occur if an operation is attempted without any work piece being present.

A work piece presence detector may be particularly useful at an operation station.

The detection may be through any known detection mechanism, such as using a weight sensor, a light beam, a mechanical switch or a camera.

It is understood that the principles disclosed herein can be used to form conveyor systems comprising hundreds of machines and thus also hundreds of OUCs, DHCs and FBCs.

The invention claimed is:

1. A conveyor system, comprising:
   a plurality of work piece carriers, each presenting a machine readable and writable memory tag and being adapted for supporting at least one work piece during transportation;
   at least two distribution highway conveyors each in the form of an endless conveyor adapted for transporting and circulating said work piece carriers;
   at least one flow balancing conveyor in the form of an endless conveyor adapted for transporting said work piece carriers,
   wherein the distribution highway conveyors are interconnected via the flow balancing conveyor, such that said work piece carriers can pass from one of the distribution highway conveyors via the flow balancing conveyor to the other distribution highway conveyor;
   at least two operation unit conveyors, each in the form of an endless conveyor adapted for transporting said work piece carriers,
   wherein the operation unit conveyors are arranged to receive a work piece carrier from an associated distribution highway, to move the work piece carrier to an operation station, and to return the work piece carrier to the distribution highway after processing at the operation station;
   wherein a respective tag writer device is configured to derive a next operation address and to write said address to the tag of the work piece carrier after the processing at the operation station; and
   wherein autonomous switch control devices are arranged at each intersection between the conveyors to control the flow of the work piece carriers at the respective intersection.

2. The system as claimed in claim 1, wherein autonomous operation station control devices are arranged at each of the operation stations to control the flow of the work piece carriers at the respective operation station.

3. The system as claimed in claim 2, wherein the operation station control devices are configured to read the memory tag and to provide an indication to the associated operation station to initiate an operation on the work piece.

4. The system as claimed in claim 2 or 3, wherein the tag writer devices are comprised in the respective operation station control device.

5. The system as claimed in claim 1, wherein the work piece carriers are releasably engageable with the conveyors based on gravity-induced friction.

6. The system as claimed in claim 1, wherein first and second flow balancing switch control devices, are arranged at intersections between the flow balancing conveyor and the respective distribution highway conveyors.

7. The system as claimed in claim 6, wherein the first flow balancing switch control device is arranged at an upstream intersection of the flow balancing conveyor with a first distribution highway conveyor, and is configured to:
   allow loaded work piece carriers to move to the flow balancing conveyor, until a predetermined number of loaded work piece carriers are present on the flow balancing conveyor, and
   allow only a predetermined number of empty work piece carriers to move from the flow balancing conveyor to the first distribution highway conveyor for a corresponding number of loaded work piece carriers that are allowed to move from the first distribution highway conveyor to the flow balancing conveyor, or vice versa.

8. The system as claimed in claim 6 or 7, wherein the second flow balancing switch control device is arranged at a downstream intersection of the flow balancing conveyor with a second distribution highway conveyor, and is configured to:
   allow empty work piece carriers to move from the second distribution highway conveyor to the flow balancing conveyor until a predetermined number of empty work piece carriers are present on the flow balancing conveyor, and
   allow only a predetermined number of loaded work piece carriers to move from the flow balancing conveyor to the second distribution highway conveyor for a corresponding number of empty work piece carriers that are allowed to move from the second distribution highway conveyor to the flow balancing conveyor, or vice versa.

9. The system as claimed in claim 6, wherein the flow balancing switch control devices are configured to read the memory tag and to control the flow to and/or from the flow balancing conveyor based on data contained on the memory tag.

10. The system as claimed in claim 6, wherein the flow balancing switch control devices comprise a tag writer and are configured to update the memory tag to indicate on which of the flow balancing conveyor and the distribution highway conveyors the work piece carrier is to be located.

11. The system as claimed in claim 1, wherein an operation unit conveyor switch control device is arranged at each intersection between each of the operation unit conveyors and the associated distribution highway conveyor.

12. The system as claimed in claim 11, wherein the operation unit switch control device is configured to read the memory tag of a work piece carrier arriving on the distribution highway conveyor and to allow the work piece carrier to move to the operation unit conveyor if data contained on the memory tag indicates an address which is associated with the operation unit conveyor.

13. The system as claimed in claim 12, wherein the operation unit switch control device is configured to allow work piece carriers to move to the operation unit conveyor until a predetermined number of work piece carriers are present on the operation unit conveyor.

14. The system as claimed in claim 12, wherein the operation unit switch control device is configured to:
detect a work piece carrier arriving on the operation unit conveyor,
to detect a work piece carrier arriving on the distribution highway conveyor, and
to allow the work piece arriving on the operation unit conveyor to move to the distribution highway conveyor only if there is no risk of collision.

15. The system as claimed in claim 11, wherein the operation unit switch control device is configured to read the memory tag of a work piece carrier arriving on the operation unit conveyor and to allow the work piece carrier to move to the distribution highway conveyor if data contained on the memory tag indicates an address which is not associated with that operation unit conveyor.

16. A production system, comprising:
a plurality of operation stations, and
a conveyor system for moving work pieces between the operation stations, comprising
 a plurality of work piece carriers, each presenting a machine readable and writable tag and being adapted for supporting at least one work piece during transportation;
 at least two distribution highway conveyors each in the form of an endless conveyor adapted for transporting and circulating said work piece carriers;
 at least one flow balancing conveyor in the form of an endless conveyor adapted for transporting said work piece carriers,
wherein the distribution highway conveyors are interconnected via the flow balancing conveyor, such that said work piece carriers can pass from one of the distribution highway conveyors via the flow balancing conveyor to the other distribution highway conveyor;
 at least two operation unit conveyors, each in the form of an endless conveyor adapted for transporting said work piece carriers,
wherein the operation unit conveyors are arranged to receive a work piece carrier from an associated distribution highway, to move the work piece carrier to one of the operation stations, and to return the work piece carrier (WPC) to the distribution highway after processing at said one of the operation stations;
wherein a respective tag writer device is configured to derive a next operation address and to write said address to the tag of the work piece carrier after the processing at said one of the operation stations; and
wherein autonomous switch control devices are arranged at each intersection between the conveyors to control the flow of the work piece carriers at the respective intersection.

17. The production system as claimed in claim 16, wherein each of the operation stations are configured to perform a function selected from the group consisting of machining, bonding, inspection, surface treatment, assembly, testing and packaging.

* * * * *